United States Patent [19]

Hansen

[11] 4,240,509
[45] Dec. 23, 1980

[54] TOOL MOUNTING ASSEMBLY FOR SOIL TILLING IMPLEMENT

[76] Inventor: Elmer K. Hansen, 801 S. Martha, Sioux City, Iowa 51102

[21] Appl. No.: 968,354

[22] Filed: Dec. 11, 1978

[51] Int. Cl.³ .............................................. A01B 61/04
[52] U.S. Cl. ..................................... 172/269; 172/699
[58] Field of Search ............... 172/269, 264, 265, 270, 172/705, 707, 708, 710, 699

[56] References Cited

U.S. PATENT DOCUMENTS

| 275,146 | 4/1883 | Clark | 172/265 |
|---|---|---|---|
| 2,493,811 | 1/1950 | Graham | 172/708 X |
| 2,935,144 | 5/1960 | Graham | 172/710 X |
| 3,402,775 | 9/1968 | Leduc | 172/705 |
| 3,700,039 | 10/1972 | Essex | 172/265 |
| 3,960,220 | 6/1976 | Laitala | 172/261 |

*Primary Examiner*—Richard J. Johnson
*Attorney, Agent, or Firm*—Rudolph L. Lowell; G. Brian Pingel

[57] ABSTRACT

An assembly for mounting the shank of a ground tool to a clamping plate carried on the tool bar of a soil tilling farm implement. The mounting assembly has a mounting member attachable to the clamping plate, a link member pivotally connecting the mounting member and the tool shank, a yieldable pressure unit for applying pressure on the link member to oppose initial movement of the tool out of an operating position and releasable coacting latch members for normally maintaining the tool in a ground engaging operating position.

2 Claims, 10 Drawing Figures

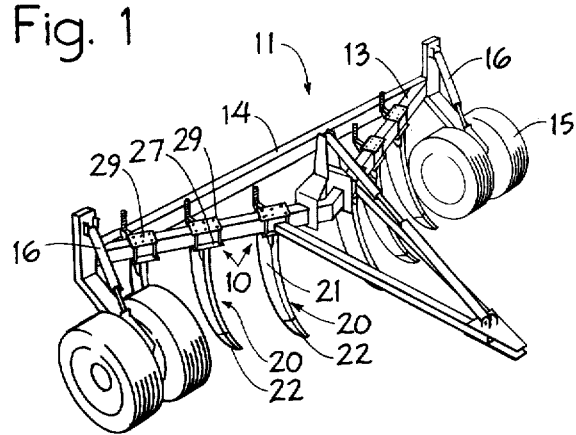
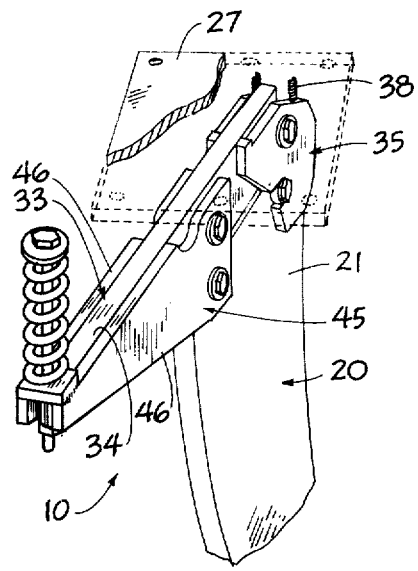
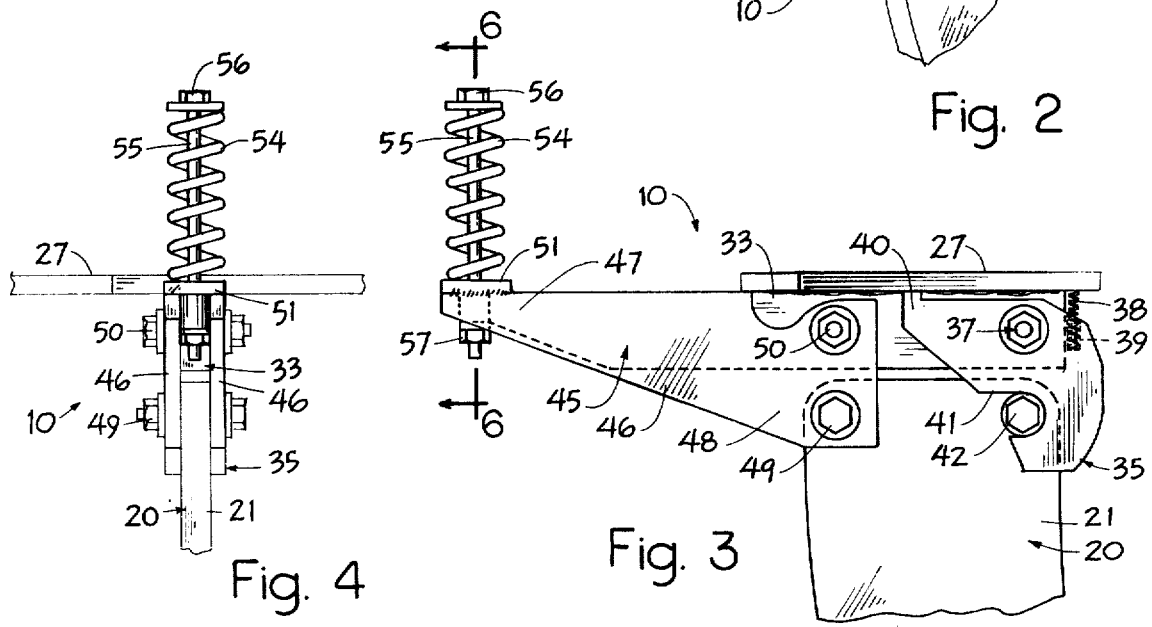
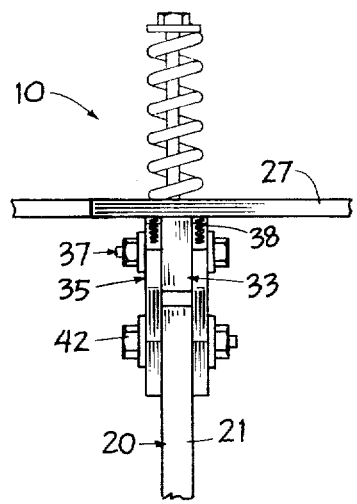
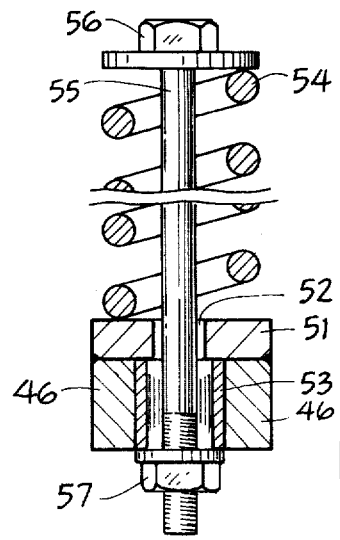

TOOL MOUNTING ASSEMBLY FOR SOIL TILLING IMPLEMENT

BACKGROUND OF THE INVENTION

1. Field of the Invention

The present invention relates in general to an assembly for mounting the shank of a ground working tool to the tool bar of a soil tilling farm implement, and more specifically relates to an assembly that releases the ground tool for pivotal movement out of an operating position upon encountering an obstruction in the soil.

2. Description of the Prior Art

Assemblies for movably mounting ground tools to a tool bar of a soil tilling farm implement are well known in the art. A typical such assembly is disclosed in U.S. Pat. No. 2,493,811, wherein a tool has a shank pivotally interconnected to a support plate and to a spring unit that has a coil spring compressed when the tool is pivoted. The coil spring provides an initial pressure on the tool to hold it in a normal operating position during a soil tilling operation. When the tool encounters an obstruction in the soil, the force applied on the tool overcomes the initial spring pressure, compresses the coil spring and pivots the tool from the normal operating position therefor. When the obstruction has been passed, the compressed spring causes the tool to return to its normal operating position.

The above type of tool mounting assembly provides an improvement over a fixed mounting of a tool on a tool bar. However, in operation the pressure exerted by the coil spring, during pivotal movement of the tool to the obstruction passing position therefor, is progressively increased. U.S. Pat. No. 3,700,039 discloses an assembly intended to reduce this problem by decreasing the moment arm of the spring force, as the spring is compressed, so that the counter force required to pivot the tool from an operating position is maintained only slightly greater than the initial force acting to hold the tool in the operating position. However, neither of the above references discloses an assembly that holds the tool in an operating position with a force that is substantially negated as the tool is pivoted out of the operating position whereby to minimize tool damage that may result from encountering an obstruction.

SUMMARY OF THE INVENTION

The present invention provides an assembly for pivotally mounting or coupling the shank of a ground tool to the tool bar of a soil tilling implement that permits the tool to pivot substantially ninety degrees out of an operating position therefor to avoid or pass over an obstruction during a soil tilling operation. The coupling assembly includes a mounting member secured to a clamping plate carried on the tool bar, a pivoted link connection means for connecting the mounting member with the tool shank, yieldable pressure means for applying pressure on the link connection means to oppose initial movement of the tool from the operating position therefor, and releasable, coacting latch means for normally maintaining the tool in its operating position.

The coacting latch means are carried on the tool shank and the mounting member such that the tool is released by the latch means only upon initial rearward movement of the tool from the operating position therefor in response to striking an obstruction so that the tool is thereafter free to pivot out of the operating position. In this way, serious damage to the tool upon encountering obstacles in the soil is readily avoided, while the tool, at all other times, is maintained in an operating position.

BRIEF DESCRIPTION OF THE DRAWINGS

FIG. 1 is a perspective view of a soil tilling implement having a tool bar shown in assembly relation with a plurality of ground tool mounting assemblies embodying a preferred embodiment of the present invention;

FIG. 2 is an enlarged perspective view of one of the tool mounting assemblies in FIG. 1 shown in assembly relation with a fragmentary upper portion of the shank of a tool, and wherein the tool is illustrated in a normal operating position therefor;

FIG. 3 is an enlarged side view in elevation of the mounting assembly of FIG. 2;

FIG. 4 is an enlarged rear view in elevation of the mounting assembly of FIG. 2;

FIG. 5 is an enlarged front view in elevation of the mounting assembly of FIG. 2;

FIG. 6 is an enlarged sectional view taken on line 6—6 of FIG. 3;

DESCRIPTION OF THE PREFERRED EMBODIMENT

Figure 7:
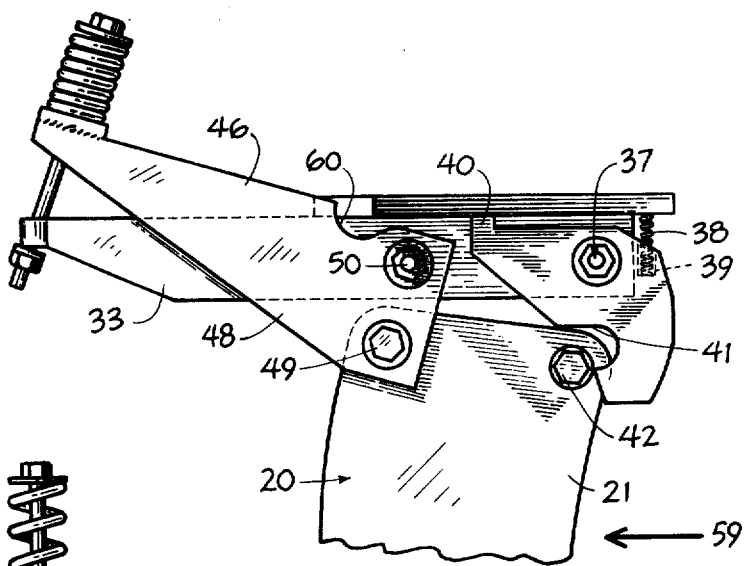
FIG. 7 is a side view illustrated similarly to FIG. 3, but showing the tool moved rearwardly from the normal operating position therefor shown in FIG. 3.

A plurality of tool coupling or mounting assemblies, indicated generally at 10 in FIG. 1, for releasably locking a ground working tool in an operating position, are shown in assembly relation with an agricultural implement 11 which includes a main frame or tool bar 13 of a V-shape in plan view, formed of rectangular steel tubing. A crossbar 14 is connected to and extended between the rear or free ends of the main frame 13 which is adjustably carried on dual wheel units 15. The elevated position of the main frame 13 can be vertically adjusted by the use of hydraulic cylinders 16 forming part of the wheel units 15.

A plurality of ground working tools 20 are supported on and extended downwardly from the main frame 13. Each tool 20 includes a steel chisel plow shank 21 curved downwardly and forwardly from the main frame 13 to a tapered end adapted to receive a replaceable chisel point 22. The shanks 21 of the tools 20 are secured to the main frame 13 by means of the coupling or mounting assemblies 10 each of which includes a lower clamping member or plate 27 at the lower side of the main frame 13 and an upper clamping plate member 29 on the upper side of the main frame 13 which are secured together by clamping bolts. The mounting assemblies 10 normally maintain the ground tools 20 in a downwardly extended operating position during soil tilling, but permit the tools 20 to pivot in a rearwardly and upwardly direction out of engagement with the soil upon encountering an obstacle that could cause damage to the tools 20.

Referring now to FIGS. 2-5, inclusive, each of the assemblies 10 includes an upright longitudinally extended main support member 33 having an upper surface 34 welded to the bottom surface of the lower clamping plate 27. A pair of rearwardly facing hooks or catch plates 35 are spaced transversely of and pivoted on the support member 33 by a pivot assembly 37 for pivotal movement as a unit at opposite sides of the support member 33. A coil spring 38 is seated in a recess 39 in the upper front portion of each of the catch plates 35 and extends upwardly therefrom to engage the lower clamping plate member 27. Thus, the springs 38 serve as bias means for yieldably holding the upper rear end portions 40 of the catch plates 35 in abutting engagement with the under surface of the lower clamping plate 27. Hook portions 41 of the catch plates 35 are arranged to receive a latch pin 42 projected through and laterally outwardly from opposite sides of the upper front end of the tool shank 21. The catch plates 35 and opposite end sections of the latch pin 42 coact to serve as a releasable latch means to releasably hold a work tool 20 in an operating position.

A link assembly 45 for pivotally interconnecting the tool shank 21 with an associated support member 33 is comprised of a pair of transversely opposite longitudinally extended link members 46 arranged at opposite sides of the support member 33 at positions rearwardly of the hook or catch plates 35. Each link member 46, in side elevation, is of a generally triangular shape having a terminal apex portion 47 located adjacent the rear end of the support member 33. Forward base portions 48 of the link members have a common lower pivot connection 49 with the upper rear portion of the shank 21 and a common upper pivot connection 50 with the support member 33.

With the tool 20 in a normal operating position, shown in FIG. 3, the upper surfaces of the link members 46 are in a plane common to the upper surface 34 of the support member 33, and a flat stop member 51 is extended between and welded to the upper edges of the apices 47 for abutting engagement with the support member 33. With the link members 46 and support member 33 thus relatively arranged the pivot connections 49 and 50 and the pivot connection 37 and latch pin 42, respectively, as also shown in FIG. 3, have their axes in a vertically spaced relation. Additionally, it is seen that the upper pivot connection 50 and pivot connection 37 have their axes spaced apart a distance equal to the spaced apart distance of the axes of the lower pivot connection 49 and latch pin 42 longitudinally of the support member 33 so as to define the corners of a rectangle.

As shown in FIG. 6, a bore 52 is formed in the stop member 51 in axial alignment with a tubular sleeve 53 located between the link members 46 and welded on the rear end of the support member 33. A coil spring 54 is mounted about the upper portion of an elongated bolt 55 loosely extended through the bore 52 and sleeve 53. The spring 54 is arranged in compression between the stop member 51 and a collar or head 56 of the bolt 55. The lower end of the bolt 55 carries a washer and nut assembly 57 that is engageable with the lower end of the sleeve 53.

The initial compression force of the spring 54 acts on the stop member 51 to yieldably hold the link members 46 against movement upwardly from the positions therefor in FIG. 3, and in turn the tool 20 against rearward pivotal movement from its operating position. Because the moment arm of the spring force relative to the pivot connection 50 is relatively long, a substantial leverage force is applied on the tool shank opposing rearward pivotal movement of the tool 20. However, when the tool 20 strikes a large obstruction in the ground, this yieldable leverage force is overcome to permit rearward movement of the tool 20. This tool moving force must be relatively large due to its application on the link members 46 through a series of relatively short moment arms.

Thus, referring to FIG. 7, it is seen that a rearward force acting on the tool shank 21 in the direction of the arrow 59 tends to concurrently pivot the shank relative to the pivot connections 49 and 50. In this respect, the base portions 48 of the link members 46 function as toggle links and the link members 46 per se as a leverage arm relative to spring 54. To pivot in a rearward direction from the operating position therefor the latch pin 42 must initially be released from the catch or hook plates 35 as illustrated in FIG. 7. This release takes place by virtue of the shank 21, in response to the applied rearward directional force, tending to be concurrently pivoted in clockwise directions relative to the pivots 49 and 50, with the pivot action about pivot 49 functioning to move the latch pin 42 downwardly and rearwardly, and the pivot action about pivot 50 functioning to move the latch pin 42 and the pivot 49 in primarily rearward directions. During this combination movement the catch plates 35 may be pivoted in a counter clockwise direction about the pivot 37 against the action of the springs 38.

As previously mentioned, the rearwardly applied force on the shank 21 is necessarily of appreciable magnitude to overcome the releasable holding action of the coacting latch means formed by the latch pin 42 and hook portions 41 maintained by the spring 54 due to the minimal moment arms provided by the arrangement of the pivots 49 and 50 relative to the toggle link or base portion 48, and the arrangement of the pivot 37 relative to the latch pin 42.

Following the initial release of the tool 20 by the latch means and continued rearward application of an obstruction force on the tool, the links or levers 46 are pivoted clockwise about the upper pivot connection 50, thus further compressing the spring 54 (FIG. 7). To permit such clockwise pivoting movement of the links 46, each link has an upper recessed portion 60 to provide a working clearance with the clamping member 27.

Figure 8:
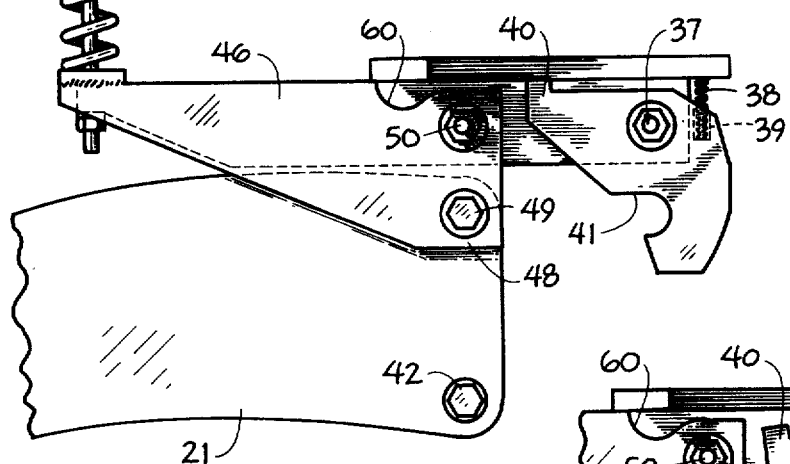
FIG. 8 is a side view illustrated similarly to FIG. 7 but showing the tool in the non-operating position therefor pivoted ninety degrees from its operating position shown in FIG. 3.
Figure 9:
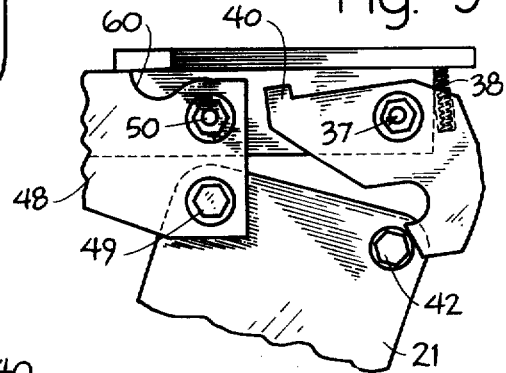
FIG. 9 is a fragmentary detail view showing the initial engagement of the coacting latch means when the tool approaches the operating position therefor.
Figure 10:
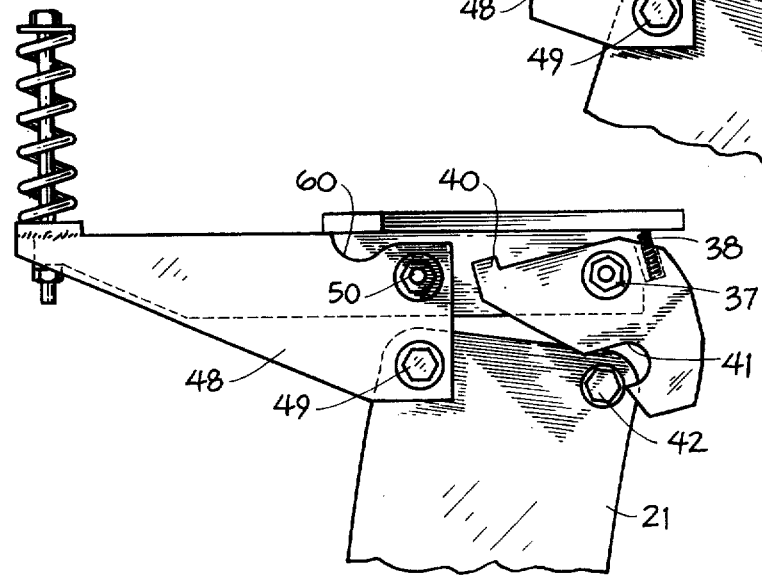
FIG. 10 is illustrated similarly to FIG. 8 showing the position of the coacting latch means as it approaches the latched or tool holding position therefor in FIG. 3.

The entire tool 20 continues to move rearwardly and the links 46 continue to pivot clockwise so long as the applied obstruction force is greater than the force opposing such pivot movement until the latch pin 42 is moved out of the hook members 35 as shown in FIG. 7. At such time, opposing forces are removed from the tool 20 which is then free to swing about the lower pivot 49. The links 46 are then returned to their normal positions (FIG. 8) by the spring 54. Simultaneously, the clockwise pivotal movement of tool 20 is continued until it has moved through an arc of approximately ninety degrees into a nonoperative position out of the ground, as also shown in FIG. 8 and out of contact with the obstruction. The force required to initially release the tool for movement to the non-operating position therefor may be varied by adjustment of the nut assembly 57.

To reset the tool 20 into the operative position therefor, the main frame 13 of the implement 11 is elevated to free the tool from ground engagement. As the result of the force of gravity, the tool then swings counterclockwise or in a forward direction until the latch pin 41 is received in the catch plates 35.

Although the invention has been described with respect to a preferred embodiment thereof, it is to be understood that it is not to be so limited since changes and modifications can be made therein which are within the full intended scope of this invention as defined by the appended claims.

I claim:

1. A ground tool mounting assembly for supporting a shank of a ground tool to the tool bar of a soil tilling farm implement and for providing rearward pivotal movement of the tool from a ground engaging operating position to an inoperative position upon encountering an obstruction during a tilling operation, said assembly comprising:
   (a) a support member,
   (b) means for securing said support member to said tool bar,
   (c) a link assembly pivotally connected to said support member at a first pivot connection and pivotally connected to said shank at a second pivot connection, said pivot connections permitting rearward movement of said shank upon rotation of the link assembly about said first connection,
   (d) pressure means for applying a yieldable pressure on said link assembly to oppose rotation of the link assembly about said first pivot connection, and
   (e) coacting latch means on said shank and on said support member for releasably locking said shank to prevent rotation of said shank about said second pivot away from said ground engaging operating position, and upon initial rearward movement of the ground tool in response to said ground tool striking an obstruction, releasing said shank thereby permitting free pivotal movement of said shank and ground tool about said second pivot to said inoperative position.

2. A ground tool mounting assembly for supporting a shank of a ground tool to the tool bar of a soil tilling farm implement and for providing rearward pivotal movement of the tool from a ground engaging operating position to an inoperative position upon encountering an obstruction during a tilling operation, said assembly comprising:
   (a) a support member,
   (b) means for securing said support member to said tool bar,
   (c) a link assembly having a front portion and a rear portion, the front portion of the link assembly being pivotally connected to said shank,
   (d) pivot means for pivotally supporting said front portion of said link assembly on said support member, said pivot means permitting rearward movement of said shank upon upward pivotal movement of said rear end portion of the link assembly relative to said pivot means,
   (e) pressure means interconnected with said support member and said rear end portion of said link assembly for yieldably opposing upward pivotal movement of said rear end portion relative to said pivot means, and
   (f) coacting latch means on said tool shank and on said support member for releasably locking said tool in said ground engaging operating position, and, upon initial rearward movement of the tool in response to striking an obstruction, releasing said tool for a free pivotal movement to said inoperative position.

* * * * *